(12) United States Patent
Lawrenson et al.

(10) Patent No.: US 10,171,793 B2
(45) Date of Patent: Jan. 1, 2019

(54) IMAGE CAPTURING DEVICE AND METHOD THEREOF

(71) Applicant: TELEFONAKTIEBOLAGET L M ERICSSON (PUBL), Stockholm (SE)

(72) Inventors: Matthew John Lawrenson, Bussigny (CH); Till Burkert, Huddinge (SE); Julian Charles Nolan, Pully (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 197 days.

(21) Appl. No.: 14/787,649

(22) PCT Filed: Aug. 26, 2015

(86) PCT No.: PCT/SE2015/050896
§ 371 (c)(1),
(2) Date: Oct. 28, 2015

(87) PCT Pub. No.: WO2017/034447
PCT Pub. Date: Mar. 2, 2017

(65) Prior Publication Data
US 2017/0163965 A1    Jun. 8, 2017

(51) Int. Cl.
*H04N 5/00*  (2011.01)
*H04N 13/221*  (2018.01)
(Continued)

(52) U.S. Cl.
CPC ............ *H04N 13/221* (2018.05); *H04N 1/00* (2013.01); *H04N 1/00244* (2013.01);
(Continued)

(58) Field of Classification Search
CPC ............... G06F 17/30; G06F 17/30864; G06F 17/30867; G06F 17/30268; G06F 17/30395
See application file for complete search history.

(56) References Cited

U.S. PATENT DOCUMENTS 8,600,194 B2 * 12/2013 Doepke ................ G06T 3/4038
                                                           345/36
8,655,620 B2 *  2/2014 Chen .................... G06F 1/1694
                                                           348/37
(Continued)

FOREIGN PATENT DOCUMENTS

WO        2015107257 A1    7/2015

OTHER PUBLICATIONS

International Search Report and the Written Opinion of the International Searching Authority, issued in corresponding International Application No. PCT/SE2015/05096, dated Dec. 10, 2015, 12 pages.

*Primary Examiner* — Frank F Huang
(74) *Attorney, Agent, or Firm* — Rothwell, Figg, Ernst & Manbeck, P.C.

(57) ABSTRACT

An image capturing device is provided comprising an image sensor for capturing a first image of a scene, a light source for illuminating the scene with a first flash of coded light, and a network interface for communicating with a communications network and/or a further image capturing device. The device is operative to encode information into the first flash, enabling retrieval of the first image from a first data storage, capture the first image, and store the first image in the first data storage. Optionally, the device may be operative to detect a second flash of coded light emitted by the further image capturing device, decode information enabling retrieval of a second image captured by the further image capturing device from a second data storage, retrieve the second image, and create a 3D model from the first image and the second image.

20 Claims, 5 Drawing Sheets

(51) Int. Cl.
  *H04N 1/00* (2006.01)
  *H04N 5/247* (2006.01)
  *H04N 13/254* (2018.01)
  *H04N 13/275* (2018.01)
  *H04N 1/21* (2006.01)
  *H04N 1/32* (2006.01)
  *H04N 13/243* (2018.01)
  *H04N 13/296* (2018.01)
  *H04N 13/178* (2018.01)
  *H04N 13/00* (2018.01)

(52) U.S. Cl.
  CPC ......... *H04N 1/215* (2013.01); *H04N 1/32267* (2013.01); *H04N 5/247* (2013.01); *H04N 13/178* (2018.05); *H04N 13/243* (2018.05); *H04N 13/254* (2018.05); *H04N 13/275* (2018.05); *H04N 13/296* (2018.05); *H04N 2013/0096* (2013.01); *H04N 2201/0084* (2013.01)

(56) References Cited

U.S. PATENT DOCUMENTS

| | | | |
|---|---|---|---|
| 8,773,502 B2* | 7/2014 | Rapoport | H04N 5/23258 348/158 |
| 8,902,335 B2* | 12/2014 | Doepke | H04N 5/23258 348/218.1 |
| 8,933,986 B2* | 1/2015 | Schall | G06T 3/4038 348/37 |
| 8,941,716 B2* | 1/2015 | Matsumoto | G03B 37/00 348/36 |
| 8,957,944 B2* | 2/2015 | Doepke | H04N 5/23238 348/211.4 |
| 2003/0133018 A1 | 7/2003 | Ziemkowski | |
| 2008/0118184 A1* | 5/2008 | Panabaker | G06F 17/30265 382/294 |
| 2009/0012944 A1* | 1/2009 | Rodriguez | G06F 17/30864 |
| 2011/0234750 A1* | 9/2011 | Lai | G03B 37/04 348/37 |
| 2013/0153651 A1* | 6/2013 | Fedorovskaya | G06K 9/2036 235/375 |

* cited by examiner

IMAGE CAPTURING DEVICE AND METHOD THEREOF

CROSS REFERENCE TO RELATED APPLICATION(S)

This application is a 35 U.S.C. § 371 National Phase Entry Application from PCT/SE2015/050896, filed Aug. 26, 2015, designating the United States, the disclosure of which is incorporated herein in its entirety by reference.

TECHNICAL FIELD

The invention relates to an image capturing device, a method of an image capturing device, a corresponding computer program, and a corresponding computer program product.

BACKGROUND

Numerous algorithms are available for creating a three-dimensional (3D) model from a set of two-dimensional (2D) images, with each 2D image being taken from a different angle relative to the captured scene (see, e.g., T. Moons, L. Van Gool, and M. Vergauwen, "3D Reconstruction from Multiple Images Part 1: Principles", Foundations and Trends in Computer Graphics and Vision, Vol. 4, pages 287-404, 2010; and J. Li, E. Li, Y. Chen, L. Xu, "Visual 3D Modeling from Images and Videos", Technical report, Intel Labs China, 2010). In simple terms, such algorithms perform the reverse process of obtaining 2D images from a 3D model. For instance, "123D Catch" is an iPad app by Autodesk which makes it possible to turn pictures into a 3D model [see, e.g., http://www.123dapp.com/catch].

The 3D model can subsequently be used for rendering images, such as 2D images for arbitrary viewing directions, or images which achieve a stereoscopic 3D effect by encoding each eye's image using filters of different, usually chromatically opposite colours, typically red and cyan (known in the art as 'anaglyph 3D').

The extent to which a 3D scene can be recreated depends on the number and spatial relation of the 2D images used. If the scene is captured in 2D images from a wider range of view-points, the 3D effect can be extended to a greater angle.

Even though algorithms for creating a 3D model from a set of 2D images exist, their use remains a niche activity as it often requires specialist equipment and/or extensive preparation. Creation of 3D models is particularly problematic when the scene is dynamic rather than static, e.g., where the scene contains a person. In such case, a set of 2D images needs to be captured from different angles relative to the scene within a relatively short time interval, requiring use of synchronized cameras.

A potentially attractive scenario is where a group of people, e.g., guests at a wedding, a birthday party, or the like, hereinafter also referred to as participants, each captures one 2D image, and these images are collated and used to create a 3D model of the captured scene.

There are two obstacles which hamper a quick and simple recreation of a, possibly non-static, 3D scene. Firstly, the 2D images need to either be selected after they have been captured, or their capturing needs to be coordinated, so that their respective time of capture occurs at approximately the same time, i.e., within a relatively short time interval. This requires accurate time synchronisation or triggering between different cameras, or capturing of a large number of images and selecting images which are appropriate for reconstructing a 3D model from the set of captured images.

Secondly, the selected images need to be transferred/exchanged between the participants' devices, which may be an issue where the participants do not know each other, do not wish to exchange contact information to facilitate sharing of images, or are not willing to spend time 'pairing' their camera with the cameras of other participants. For most situations, the level of coordination and networking of cameras which is required for creating a 3D model from a set of 2D images is overly complicated.

SUMMARY

It is an object of the invention to provide an improved alternative to the above techniques and prior art.

More specifically, it is an object of the invention to provide an improved solution for sharing images. It is a further object of the invention to provide an improved solution for creating a 3D model from a set of 2D images.

These and other objects of the invention are achieved by means of different aspects of the invention, as defined by the independent claims. Embodiments of the invention are characterized by the dependent claims.

According to a first aspect of the invention, an image capturing device, such as a mobile terminal, a smartphone, a User Equipment (UE), a tablet, or a digital camera, is provided. The image capturing device comprises an image sensor for capturing a first image of a scene, a light source for illuminating the scene with a first flash of coded light during capturing of the first image by the image sensor, and a network interface for effecting wireless communications with a communications network and/or a further image capturing device. The image capturing device further comprises processing means which are operative to encode information into the first flash. The information which is encoded into the first flash enables retrieval of the first image from a first data storage. The processing means are further operative to capture the first image, and store the first image in the first data storage.

According to a second aspect of the invention, a method of an image capturing device, such as a mobile terminal, a smartphone, a UE, a tablet, or a digital camera, is provided. The method comprises illuminating a scene with a first flash of coded light, wherein information is encoded into the first flash. The method further comprises capturing a first image of the scene and storing the first image in a first data storage. The information which is encoded into the first flash enables retrieval of the first image from the first data storage.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that the process of creating a 3D model from a set of 2D images, which are individually captured by different cameras or other image capturing devices operated by individuals of a group of people, may be improved by utilizing flashes of coded light which carry information about where and/or how an image taken by the image capturing device emitting the flash can be retrieved. For instance, the encoded information may comprise a location of the image in a data storage, such as an Internet Protocol (IP) address or a Uniform Resource Locator (URL), any other type of network address, or a device identifier, and/or credentials which are required for retrieving the image from the data storage, such as a login and/or a password, or a shared secret. The data storage may be comprised in the image capturing device, such as a built-in memory or a memory card. Alternatively, the data storage may be an external data storage which is accessible over a communications network, such as a server or a network node on the Internet which may be operated by a social network provider like Facebook or Instagram.

To this end, if a user takes an image with his/her image capturing device, e.g., a smartphone or a mobile terminal comprising a camera, or a digital camera, the scene is being illuminated with coded light emitted by the flash of the image capturing device. The coded light contains information about where and/or how the image can be accessed. This information can be encoded either spatially or temporally, and the encoding can be achieved through the variation of a number of parameters, such as brightness or color balance. Even in cases where visible light is used, which is the case for most camera flashes, information can be encoded in a way which is imperceptible to the human eye. This technology is known as Visible Light Communication (VLC).

According to an embodiment of the invention, the image sensor is operative to detect a second flash of coded light emitted by a further image capturing device and the processing means are further operative to decode information which is encoded into the second flash. The encoded information enables retrieval of a second image captured by the further image capturing device from a second data storage. For instance, the encoded information may comprise a location of the second image in the second data storage, such as an IP address or a URL, any other type of network address, or a device identifier, and/or credentials which are required for retrieving the image from the second data storage, such as a login and/or a password, or a shared secret. The second data storage may either be comprised in the further image capturing device, or may be an external data storage which is accessible over a communications network, such as a server or a network node on the Internet. The processing means are further operative to retrieve the second image from the second data storage, which may be the same as the first data storage or separate from the first data storage, and create a 3D model from the first image and the second image. Optionally, the 3D model is only created if a time interval between capturing the first image and capturing the second image is below a threshold time interval, i.e., only if it is assessed that the second image is suitable for creating a 3D model from the first image and the second image. If a dynamic scene is captured, the threshold time interval may be determined based on an amount of motion in the scene. That is, the faster the scene changes, the shorter the threshold time interval. Further optionally, the second image is only retrieved if the time interval is below the threshold time interval. There may be other criteria which are used in addition to, or instead of, the time interval which has passed between capturing the first image and capturing the second image in assessing whether the first image and the second image are suitable for creating a 3D model. For instance, the suitability of the second image for creating a 3D model may be assessed based on the brightness of the second image. If the second image is sufficiently bright, this is an indication that the second image has captured the scene which was illuminated by the first flash.

The use of a flash emitting coded light not only allows information to be exchanged between digital cameras, smartphones, or other image capturing devices, without any manual pairing or exchange of personal information. Rather, by detecting a flash emitted by another image capturing device, the time of capture of the image just captured by the other image capturing device is known to the image capturing device detecting the flash. This is the case since a flash emitted by an image capturing device coincides with the capture of an image by that device. Finally, detecting a flash is an assurance that the image taken by the other image capturing device is of substantially the same scene as that being viewed by the image capturing device detecting the flash. This is the case since light emitted by a camera flash has a limited range, typically up to a few or maybe ten meters. Hence, the fact the image capturing device has detected the flash of the other image capturing device is an indication that it was in proximity of the other image capturing device, with the field of view of its image sensor being directed towards the scene which was illuminated by the flash of the other image capturing device.

Thus, if a flash of coded light is detected by the image capturing device, the image capturing device can decode the information contained in the flash, assess the suitability of the image for use in the creation of a 3D model, and obtain a copy of the image if the image is assessed to be suitable for creating a 3D model. The copy of the image can be obtained by utilizing the information retrieved from the flash. After two or more 2D images of a scene are obtained, each taken within a sufficiently short time interval and from a different angle relative to the scene, they can be algorithmically combined to create a 3D model of the captured scene, using one of the algorithms known in the art.

Alternatively, rather than retrieving the second image from the second data storage, the processing means may further be operative to associatively store the decoded information with the first image. This may be achieved by storing the decoded information with the first image, e.g., as metadata. As an alternative, the decoded information may be stored in a database together with information identifying the first image, e.g., a filename or an identifier of the first image. The associatively stored information can subsequently be used for creating a 3D model from a set of 2D images, by retrieving one or more 2D images using the associatively stored information and algorithmically combining the 2D images into a 3D model using one of the algorithms known in the art.

According to an embodiment of the invention, the first image may be captured in response to detecting the second flash emitted by the further image capturing device. That is, rather than capturing an image independently of other image capturing devices, and assessing the suitability of images captured by other image capturing devices based on their respective time of capture, capturing the first image may be triggered by detecting a flash which is emitted by another image capturing device. Thereby, the first image and the second image are captured within a relatively short time interval, which makes it likely that the first image and the second image are suitable for creating a 3D model. In a scenario where several image capturing devices are used for capturing images of a scene, a set of 2D images which are captured within a relatively short time interval may be obtained using the flash of the first image capturing device taking a picture of the scene for triggering the other image capturing devices.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
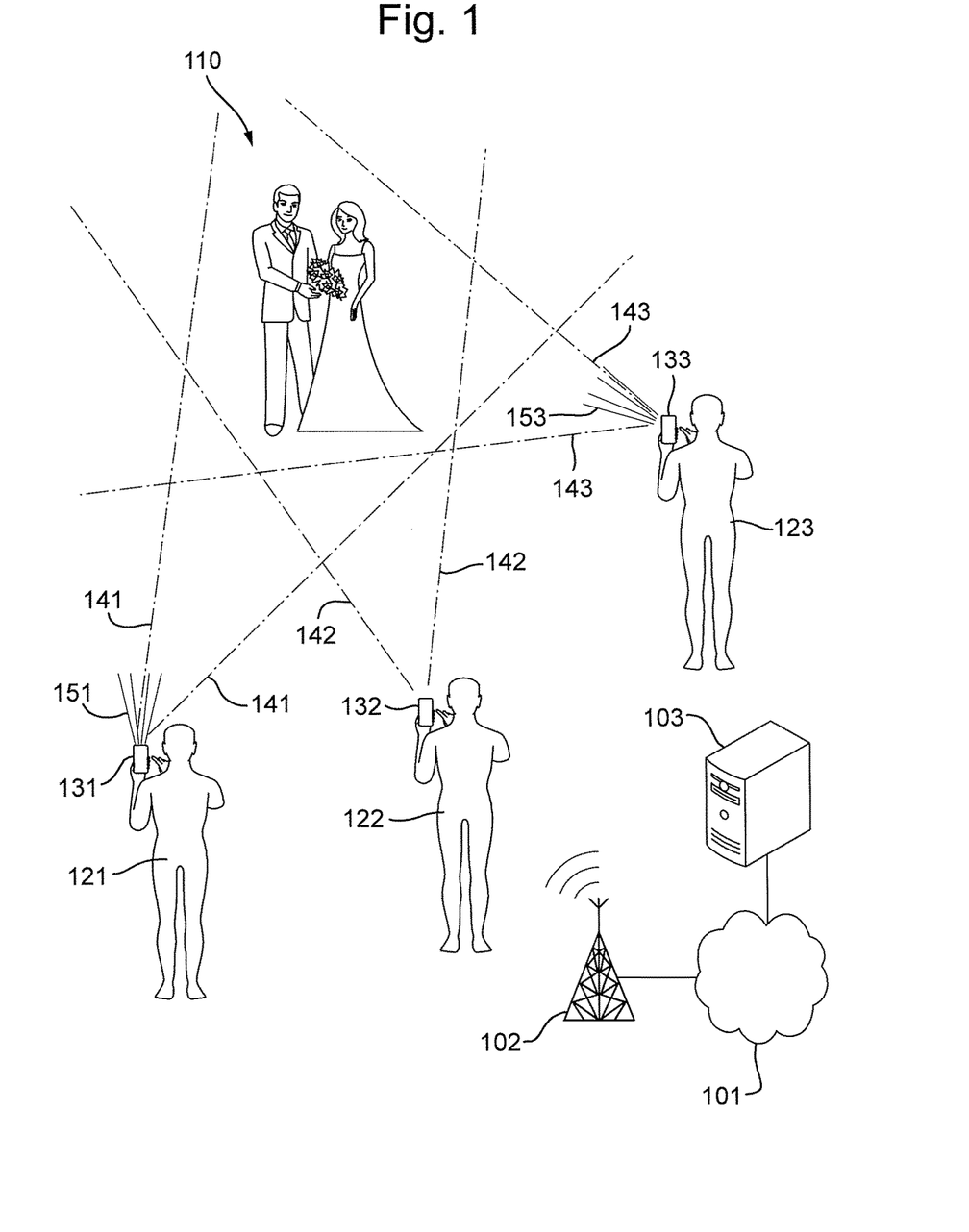
FIG. 1 illustrates a group of image capturing devices capturing images of a scene, in accordance with an embodiment of the invention.

FIG. 1 illustrates a group of people 121-123, such as guests at a wedding, each using a respective image capturing device 131-133 for capturing a 2D image of a scene 110. Each of image capturing devices 131-133 is an electronic device capable of capturing an image, commonly referred to as taking a picture, with a respective field of view 141-143. Image capturing devices 131-133 may be embodied as smartphones 210 or digital cameras 220 shown in FIG. 2, mobile terminals, UEs, tablets, or the like.

In the following, embodiments of the invention are elucidated with reference to FIGS. 3 and 4, which exemplify the interaction between two of image capturing devices 131-133, first image capturing device 131 and second image capturing device 133, by way of sequence diagrams.

Figure 2:
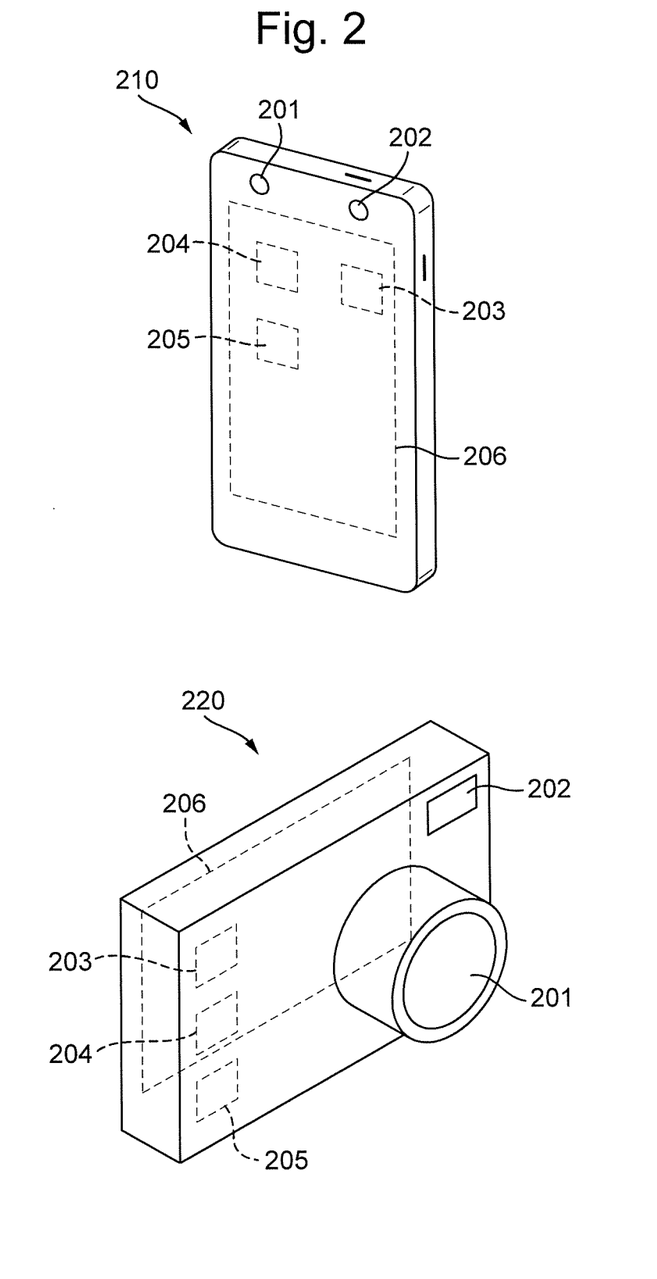
FIG. 2 shows a smartphone and a digital camera, in accordance with embodiments of the invention.

Sequence diagram 310 illustrates embodiments of the invention which utilize an internal data storage, i.e., a data storage which is comprised in the image capturing device, such as data storage 203 comprised in smartphone 210 or digital camera 220. The internal data storage may, e.g., be a built-in memory or a removable memory card, based on Random Access Memory (RAM), Flash memory, or the like.

Figure 3:
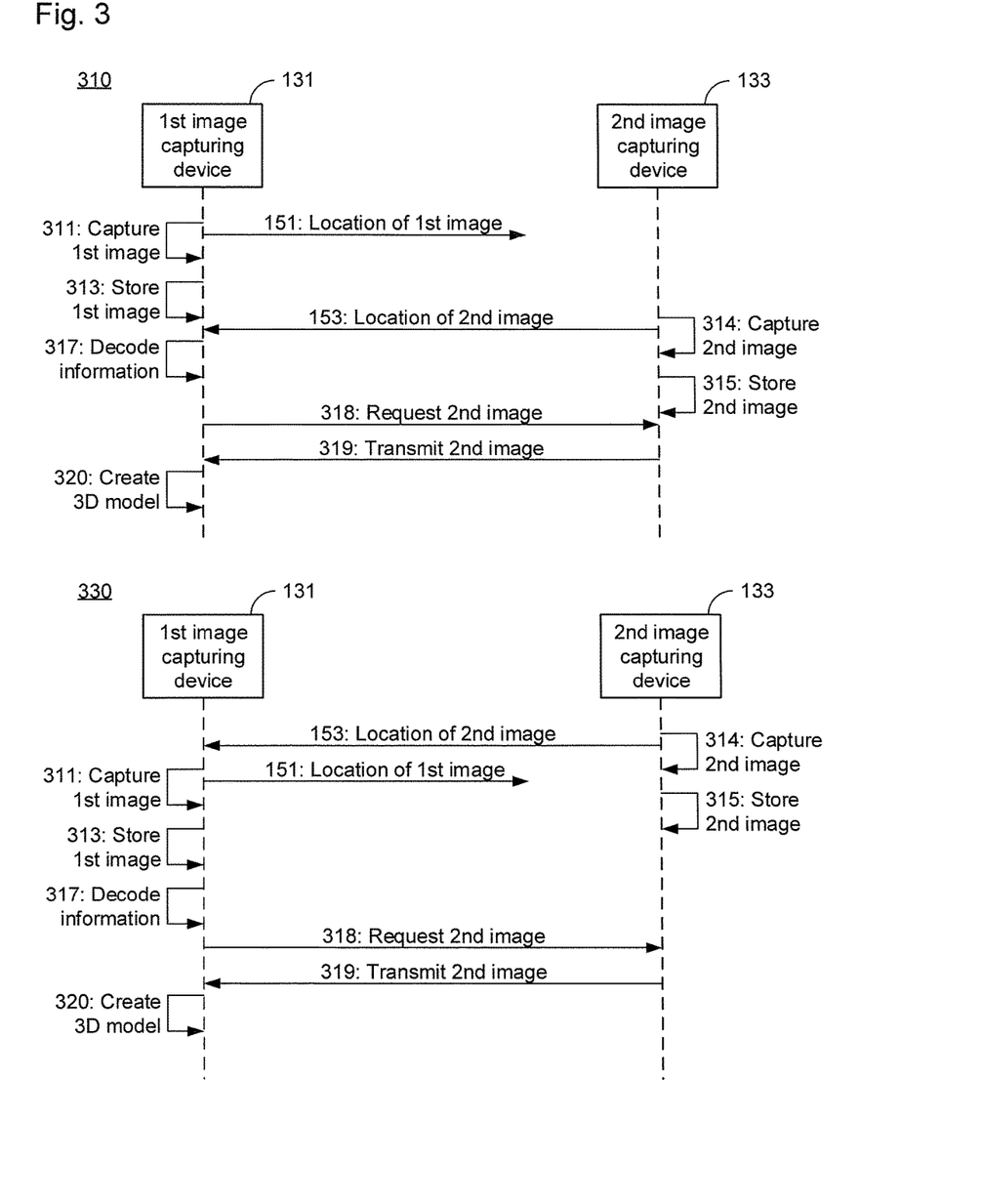
FIG. 3 shows sequence diagrams illustrating embodiments of the invention which utilize an internal data storage.

With reference to FIG. 3, first image capturing device 131 captures 311 a first image which is subsequently stored 313 in the first data storage, which is an internal data storage 203 of first image capturing device 131. During capturing 311 of the first image, first image capturing device 131 emits a first flash 151 of coded light for illuminating scene 110 which is captured 311 in the first image. Information is encoded into first flash 151 which enables retrieval of the first image from the first data storage. For instance, the encoded information may comprise an IP address, a URL, any other type of network address, or a device identifier, which enables other network nodes, including further image capturing devices, to access the first data storage of first image capturing device 131 and retrieve of the first image.

As an example, the encoded information may comprise an IP address which is currently assigned to first image capturing device together with a path which can be resolved by first image capturing device 131 to retrieve the first image if a request for the first image is received:

172.16.254.1/shared/images/image0123.jpg

In this example, "172.16.254.1" is the IP address which is assigned to first image capturing device 131, and "/shared/images/image0123.jpg" is the path to the first image "image0123.jpg" in the local data storage 203. It will be appreciated that embodiments of the invention are not limited to IPv4-types of addresses exemplified above, but may use any type of information which is suitable for identifying the location of an image in a data storage.

The encoded information may additionally comprise credentials which are required for retrieving the first image from the first data storage, such as a login and/or a password, or a shared secret. It may additionally comprise further information, such as information identifying a user 121 of first image capturing device 131, e.g., an email address, a name, an address, a phone number, or a link to a social network page of user 121. In addition, the information may also comprise other information which is frequently stored as metadata with images, such as a current time stamp for identifying the date and time when the first image was captured 311, and/or position or location information identifying a position or location of first image capturing device 131 when the first image was captured 311. Advantageously, first flash 151 may be detected, and the information it carries decoded, by any image capturing device 132 or 133 which is in proximity of first image capturing device 131, allowing user 121 to share a picture she has taken with other people 122 and 123 in a simple way.

Substantially coinciding with capturing 311 of the first image by first image capturing device 131, second image capturing device 133 captures 314 a second image which it stores 315 in a second data storage 203, which in sequence diagram 310 is assumed to be a local data storage 203, i.e., comprised in second image capturing device 133. During capturing 314 of the second image, second image capturing device 133 emits a second flash 153 of coded light. Information is encoded into second flash 153 which enables retrieval of the second image from the second data storage, in accordance with what is described above with reference to information which is encoded into first flash 151.

First image capturing device 131 detects second flash 153, by means of its image sensor 201 or a separate sensor which is dedicated for sensing flashes of coded light, and decodes 317 the information which is encoded into second flash 153. Second flash 153 is an indication that second image capturing device 133 has captured the second image. Moreover, detecting second flash 153 by first image capturing device 131 is an assurance that both image capturing devices 131 and 133 have been in proximity when the second image was captured 314 by second image capturing device 133, and that first image capturing device 131 had its image sensor, having a field of view 141, directed towards the scene 110 which was illuminated by second image capturing device 133, as is illustrated in FIG. 1. That is, users 121 and 123, operating first and second image capturing devices 131 and 133, respectively, are in the process of taking pictures of the same scene 110.

The decoded 317 information may subsequently be used for retrieving the second image from the second data storage, where it has been stored by second image capturing device 133. For instance, first image capturing device 131 may request 318 the second image from second image capturing device 133, which retrieves the second image from its local data storage, the second data storage, and transmits 319 the second image to first image capturing device 131. The request 318 for the second image may comprise any one, or a combination of, an IP address, URL, a device identifier, or any other type of network address or identifier assigned to second image capturing device 133, in combination with a path to the second image in the second data storage, e.g.:

172.16.254.3/shared/images/image0456.jpg

In this example, "172.16.254.3" is the IP address which is assigned to second image capturing device 133, and "/shared/images/image0456.jpg" is the path to the second image "image0456.jpg" in the local data storage 203. It will be appreciated that embodiments of the invention are not limited to IPv4-types of addresses exemplified above, but may use any type of information which is suitable for identifying the location of an image in a data storage. The request 318 and its response 319 may utilize any suitable protocol such as Transmission Control Protocol (TCP)/IP, HyperText Transfer Protocol (HTTP), or the like. The exchange of messages 318 and 319 is effected by means of wireless communications, utilizing network interfaces 204 which image capturing devices 131 and 133 are provided with. The wireless communications may either be effected directly between first image capturing device 131 and second capturing device 133, e.g., using a Wireless Local Area Network (WLAN)/WiFi ad-hoc network, AirPlay, Bluetooth, or the like, or through a communications network 101, such as the Internet, and one or more Radio Access Networks 102 (RANs).

In response to receiving 319 the second image from second image capturing device 133, first image capturing device 131 creates 320 a 3D model from the first image and the second image, using any algorithm known in the art. Optionally, the 3D model is only created 320 if a time interval between capturing 311 the first image and capturing 314 the second image is below a threshold time interval. Together with the assurance that the first image and the second image have captured the same scene, this implies that the first image and the second image are suitable for creating a 3D model, under the condition that the threshold time interval is sufficiently short. The threshold time interval may, e.g., be configured by user 121 of image capturing device 131, and/or determined based on the algorithm which is used for creating 320 a 3D model from the first and the second image. Alternatively, the threshold time interval may be determined dynamically, based on an amount of motion in the captured scene. For instance, the faster an object in the captured scene moves, the shorter the threshold time interval. This is particularly advantageous if a non-static scene is captured.

Advantageously, embodiments of the invention do not rely on time stamps of images which are retrieved from other image capturing devices. Rather, an image capturing device detecting a flash emitted by another image capturing device can establish the time of capture based on its own internal clock. Thereby, the time which has lapsed between capturing 311 the first image and capturing 314 the second image can be established with high accuracy.

In addition to the time which has lapsed between capturing 311 the first image and capturing 314 the second image, other criteria may be used for assessing the suitability of the first image and the second image for creating 320 a 3D model, such as the brightness of the second image. That is, if the second image is sufficiently bright, this is an indication that the second image captures the scene which was illuminated by first flash 151.

Optionally, the second image is only retrieved 318/319 if the time interval is below the threshold time interval, and/or if it is assessed that the first image and the second image are suitable for creating 320 a 3D model. Thereby, images are only retrieved if it is likely that they are suitable for creating a 3D model.

As an alternative to retrieving 318/319 the second image from second image capturing device 133 and creating 320 a 3D model from the first and the second image, first image capturing device 131 may, after decoding 317 the information which is encoded into second flash 153, associatively store the decoded information with the first image (not illustrated in FIG. 3), e.g., as metadata of the first image or in a database where it is stored together with information identifying the first image, such as a filename or an identifier of the first image.

As an example, if the first image is stored in a local data storage 203 of first image capturing device 131 in a file "image0123.jpg", and the second image can be accessed at a location in a local data storage of second image capturing device 153, e.g., "172.16.254.3/shared/images/image0456.jpg", the following entry may be stored in the database:

image0123.jpg; 172.16.254.3/shared/images/image0456.jpg

The associatively stored information can subsequently be used for creating a 3D model from the first and the second image, by retrieving the first image, retrieving the second image, and algorithmically combining the first and the second image into a 3D model using one of the algorithms known in the art.

Further with reference to FIG. 3, sequence diagram 330 is similar to sequence diagram 310 but illustrates an alternative embodiment of the invention. Here, image capturing device 131 captures 311 the first image in response to detecting second flash 153 emitted by second image capturing device 133. In other words, second flash 153 triggers capturing 311 of the first image. In this way, it can be ensured that the first image and the second image are captured 311/314 within a certain (relatively short) time interval. For instance, first image capturing device 131 may be configured, e.g. by user 121, to capture the first image in response to detecting a flash emitted by another image capturing device. Together with the assurance that the first image and the second image capture the same scene, this implies that the first image and the second image are suitable for creating 320 a 3D model, under the condition that the time interval is configured to be sufficiently short to allow creation 320 of a 3D model. Moreover, if several image capturing devices are set to capture an image in response to detecting a flash emitted by another image capturing device, a set of 2D images can be captured within a time interval which is sufficiently short to allow creation of a 3D model.

Figure 4:
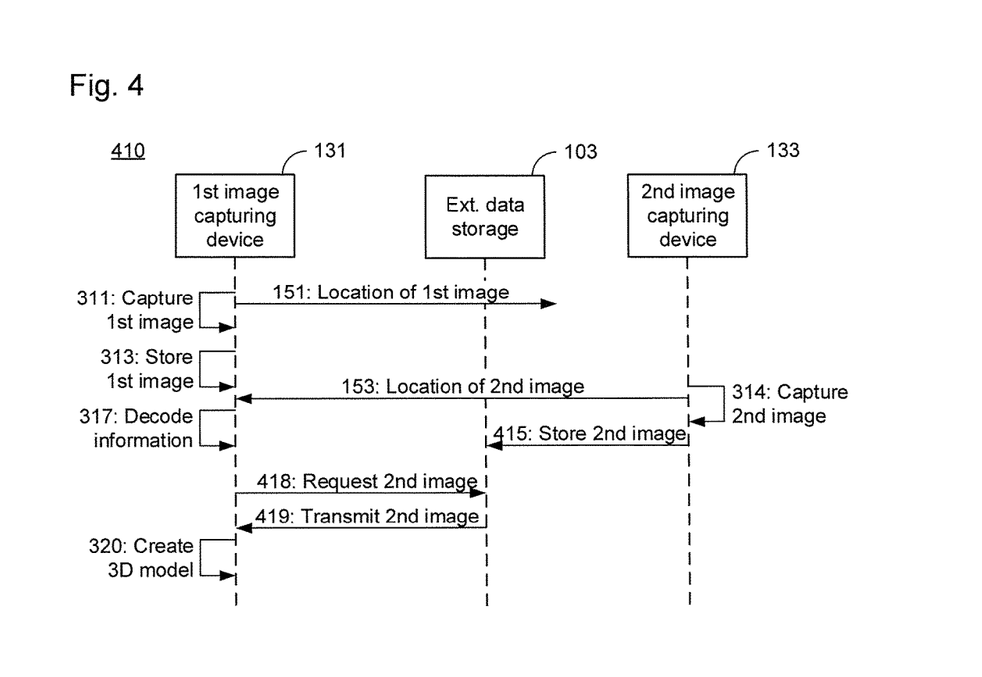
FIG. 4 shows a sequence diagram illustrating embodiments of the invention which utilize an external data storage.

In FIG. 4, a further sequence diagram 410 is shown which illustrates embodiments of the invention utilizing an external data storage, such as a server or a network node 103 for exchanging and/or sharing captured images. External data storage 103 is accessible by first image capturing device 131 and second image capturing device 133, typically via a communications network 101, e.g., the Internet, and/or one or more RANs 102. The steps and message exchanges illustrated in sequence diagram 410 are similar to those described with reference to FIG. 3, with the exception of second image capturing device 133 storing 415 the second image in external data storage 103, instead of an internal data storage 203, and first image capturing device 131 retrieving 418/419 the second image from external data storage 103. Storing 415 the second image is achieved by transmitting 415 the second image to external data storage 103, and retrieving the second image is achieved by requesting 418 the second image from external data storage 103, which in response to receiving request 418 transmits 419 the second image to first image capturing device 131. The request 418 and its response 419 may utilize any suitable protocol such as TCP/IP, HTTP, or the like. The exchange of messages 418 and 419 is effected by means of wireless communications, utilizing network interfaces 204 which image capturing devices 131 and 133 are provided with.

It will also be appreciated that first image capturing device 131 and second image capturing device 133 may effect wireless communications directly with external data storage 103, if external data storage 103 is provided with a compatible network interface. For instance, external data storage 103 may be a data storage device which is set up for collecting images at an event, such as a Network Attached Storage (NAS) which is configured for communicating with image capturing devices 131-133 via WLAN/WiFi, Bluetooth, AirPlay, an ad-hoc network, or the like.

Embodiments of the invention may utilize an external data storage 103 which is operated by a social network or a provider of an image sharing service, e.g., Facebook or Instagram. In such case, the information enabling retrieval of an image from external data storage 103 may, e.g., comprise a URL of a social network page of a user of the image capturing device, or a page for posting images, in combination with a path identifying the location of the image. As an example, the information may be of the form:

http://facebook.com/userABC/images/image0456.jpg

In this example, the information identifies the location of image "image0456.jpg" on a Facebook page of user "userABC". As a further example, the URL may comprise an identifier of the image, which can be used for retrieving the image from a database:

http://facebook.com/photo.php?fbid=12345678912345, where "12345678912345" identifies a certain image, e.g., "image0456.jpg" of user "userABC".

Embodiments of the invention utilizing external data storage 103 may also be envisaged which capture 311 the first image in response to detecting second flash 153, in correspondence to what is illustrated in sequence diagram 330 show in FIG. 3.

It will also be appreciated that embodiments of the invention are not limited to the exact order of steps performed by image capturing devices 131 and 133, and the order of messages exchanged between them, as illustrated in sequence diagrams 310, 330, and 410. For instance, first image capturing device 131 may store 313/413 the first image before decoding 317/417 the information which is encoded into second flash 153.

By encoding information into a flash, using visible coded light, which information enables retrieval of an image captured by an image capturing device, embodiments of the invention provide an easy way of sharing an image with other people who were present, and operating their respective image capturing devices, when the image was captured. The solution provided herein alleviates participants at an event, such as a wedding, a birthday party, or the like, from exchanging contact information or otherwise engage in the process of sharing their images with each other. Rather, the information which enables retrieval of a captured image can be obtained by detecting a flash which is emitted by an image capturing device capturing an image. In that way, images can be shared with others in an easy manner, regardless of whether they are subsequently used for creating a 3D model from a set of suitable 2D images, or for other purposes. In particular, embodiments of the invention may advantageously be used for the sole purpose of sharing images.

It will also be appreciated that embodiments of the invention are not limited to sharing of images between only two image capturing devices, such as first image capturing device 131 and second image capturing device 133. Rather, embodiments of the invention may be envisaged which share images with, and/or retrieve images from, any number of other image capturing devices. Advantageously, an improved 3D model is obtained if more than two 2D images are used for creating the 3D model.

In the following, embodiments of image capturing devices 131-133 are described with reference to FIG. 2, which illustrates a smartphone 210 and a digital camera 220. An embodiment 210/220 of the image capturing device comprises an image sensor 201 for capturing a first image of a scene 110, a light source 202 for illuminating the scene with a first flash 151 of coded light during capturing of the first image by image sensor 201, and a network interface 204 for effecting wireless communications with a RAN 102 and/or a further image capturing device.

In the present context, an image sensor may, e.g., be of Charge Coupled Device (CCD) or Complementary Metal-Oxide-Semiconductor (CMOS) type, and is used for converting light into discrete signals which can be stored in digital format and processed by digital electronics, e.g., a processor. Typically, modern smartphones 210 comprise at least one image sensor 201 which is provided on the rear face. It will be appreciated that such image sensors are frequently combined with an optical system, such as a lens, to focus the light on the image sensor, a shutter, and the like. Alternatively, the image sensor may also be of light-field camera type, which allows post-capture change of focal depth.

Light source 202 may, e.g., be a Light-Emitting Diode (LED) which is frequently used as flash in today's smartphones 210. Due to the high switching frequency of LEDs, LED-based flashes are particularly suitable for encoding information into flashes of light, as is described herein. Alternatively, Xenon-type flashes may be used as light source 202.

Network interface 204 may support wireless communications via a cellular mobile network, e.g., Global System for Mobile Communications (GSM), Universal Mobile Telecommunications System (UMTS), or Long Term Evolution (LTE), via a WLAN/WiFi network, or utilize a short-ranged radio technology such as Bluetooth.

Image capturing device 210/220 further comprises processing means 205 which are operative to encode information into the first flash, which information enables retrieval of the first image from a first data storage, capture the first image, and store the first image in the first data storage. The first data storage may either be comprised in the image capturing device, such as built-in data storage 203, or external data storage 103 which is accessible via communications network 101 and/or RAN 102. The information which is encoded into the first flash may comprise a location of the first image in the first data storage, such as an IP address, and URL, a path, or the like, and may further comprise additional information described hereinbefore.

In an embodiment of image capturing device 2110/220, image sensor 201 is further operative to detect a second flash of coded light emitted by a further image capturing device, and processing means 205 is further operative to decode information which is encoded into the second flash, which information enables retrieval of a second image captured by the further image capturing device from a second data storage, retrieve the second image from the second data storage, and create a 3D model from the first image and the second image. The second data storage may be comprised in the further image capturing device, such as built-in data storage 203, or external data storage 103 which is accessible via communications network 101 and/or RAN 102. The second image is retrieved via network interface 204, either directly from the further imaging capturing device, e.g., via short-ranged radio or an ad-hoc WLAN/WiFi network, or from external data storage 103, e.g., a network node or server which is accessible via communications network 101 and/or RAN 102. Optionally, the 3D model is only created if a time interval between capturing the first image and capturing the second image is below a threshold time interval. Further optionally, the second image is only retrieved if the time interval is below the threshold time interval, and/or if other criteria are fulfilled, e.g., if the brightness of the second image exceeds a certain threshold value, as was described before.

As an alternative to retrieving the second image based on the information which is encoded into the second flash, embodiments of image capturing device 210/220 may also decode the information which is encoded into the second flash and associate the decoded information with the first image. In particular, this may be achieved by associatively storing the information with the first image, either as metadata of the first image or in a database, as was described hereinbefore.

Optionally, embodiments of image capturing device 210/220 may capture the first image in response to detecting the second flash emitted by the further image capturing device. That is, the second flash triggers capturing of the first image. For instance, an embodiment of image capturing device 210/220 may be configurable, by means of user settings, to capture an image when the camera button is pressed down and when a flash is detected. Thereby, if several image capturing devices are used for capturing 2D images of the same scene, the image capturing device capturing the first image may trigger capturing of images by the other image capturing devices. Advantageously, a set of images is thereby obtained which are captured within a relatively short time interval, and which accordingly are suitable for creating a 3D model of the captured scene.

Figure 5:
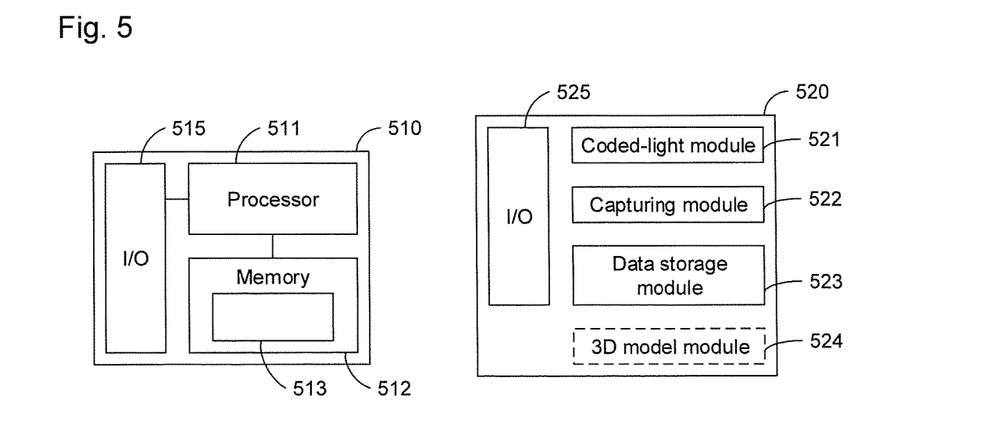
FIG. 5 shows embodiments of the processing unit of the image capturing device.

In FIG. 5, two embodiments 510 and 520 of processing means 205, comprised in image capturing device 210/220, are shown.

Processing means 510 comprises a processing unit 511, such as a general purpose processor, and a computer-readable storage medium 512, such as a RAM, a Flash memory, or the like. In addition, processing means 510 comprises one or more interfaces 515 ("I/O" in FIG. 5) for controlling, and receiving information from, image sensor 201, light source 202, internal data storage 203, and network interface 204.

Memory 512 contains computer-executable instructions 513, i.e., a computer program, for causing an image capturing device, such as a smartphone, a digital camera, a mobile terminal, a UE, a tablet, or the like, to perform in accordance with an embodiment of the invention as described herein, when computer-executable instructions 513 are executed on processing unit 511.

In an alternative embodiment, processing means 520 comprises a coded-light module 521 for encoding information into the first flash of coded light, a capturing module 522 for capturing a first image of a scene, a data storage module 523 for storing the first image in a first data storage, and an optional 3D model module 524 for creating a 3D model from the first image and a second image which is retrieved from a further image capturing device. In addition, processing means 520 comprises one or more interfaces 525 ("I/O" in FIG. 5) for controlling, and receiving information from, image sensor 201, light source 202, internal data storage 203, and network interface 204. Modules 521-525 may be implemented by any kind of electronic circuitry, e.g., any one, or a combination of, analogue electronic circuitry, digital electronic circuitry, and processing means executing a suitable computer program.

Figure 6:
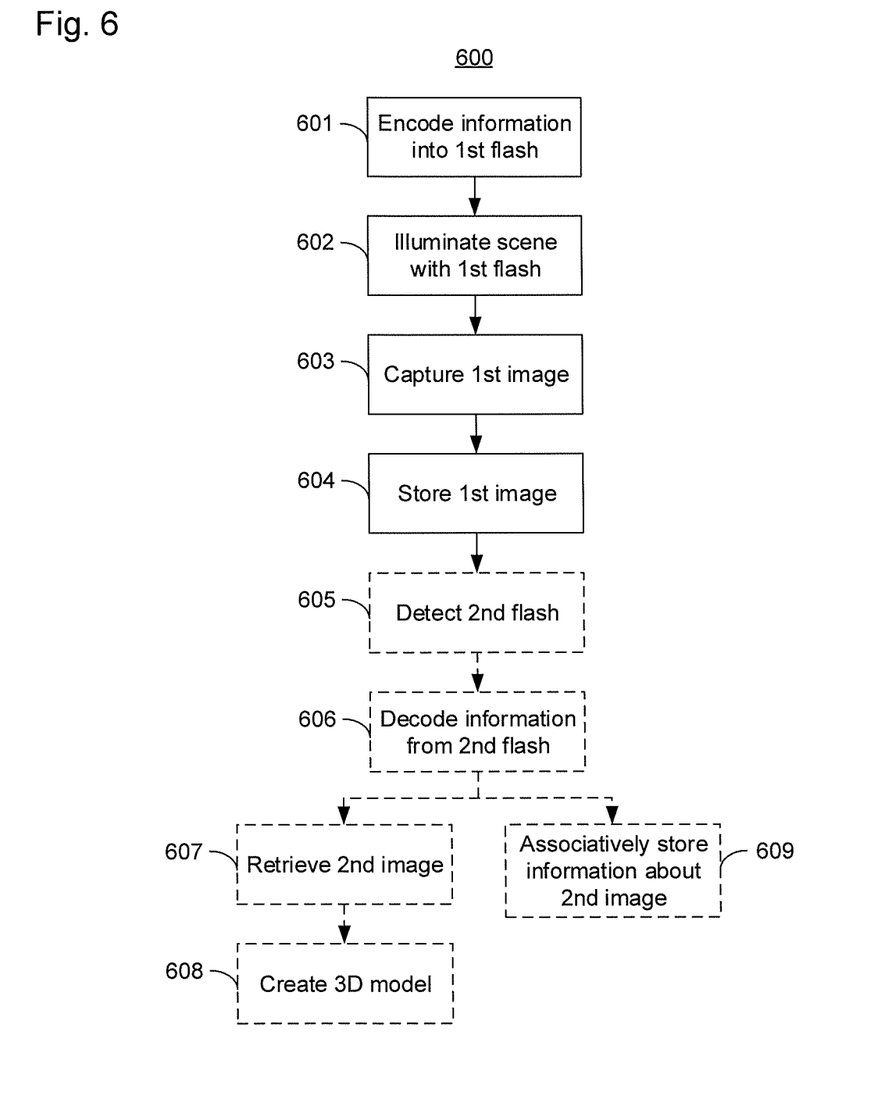
FIG. 6 is a flow chart illustrating a method of an image capturing device, in accordance with embodiments of the invention.

In FIG. 6, a flow chart 600 is shown which illustrates embodiments of the method of an image capturing device, such as a smartphone, a digital camera, a mobile terminal, a UE, a tablet, or the like. Method 600 comprises illuminating 602 a scene with a first flash of coded light, wherein information is encoded 601 into the first flash, capturing 603 a first image of the scene, and storing 604 the first image in a first data storage. The information which is encoded 601 into the first flash enables retrieval of the first image from the first data storage. The first data storage may, e.g., be comprised in the image capturing device. Alternatively, the first data storage may be an external data storage which is accessible by the image capturing device, and the first image is stored in the first data storage by transmitting the first image to the first data storage. The information which is encoded into the first flash may, e.g., comprise a location of the first image in the first data storage.

Method 600 may further comprise detecting 605 a second flash of coded light emitted by a further image capturing device, and decoding 606 information which is encoded into the second flash. The encoded information enables retrieval of a second image captured by the further image capturing device from a second data storage. The second data storage may, e.g., be comprised in the further image capturing device. Alternatively, the second data storage may be an external data storage which is accessible by the further image capturing device. The information which is encoded into the second flash may, e.g., comprise a location of the second image in the second data storage. Method 600 may further comprise retrieving 607 the second image from the second data storage, and creating 608 a 3D model from the first image and the second image. Optionally, the 3D model is only created 608 if a time interval between capturing the first image and capturing the second image is below a threshold time interval.

As an alternative to retrieving 607 the second image and creating 608 a 3D model, the decoded information may also be associatively stored 609 with the first image, as metadata of the first image or in a database, as is described hereinbefore.

The first image may optionally be captured in response to detecting the second flash emitted by the further image capturing device, as is illustrated in sequence diagram 330 shown in FIG. 3 and described hereinbefore.

It will be appreciated that method 600 may comprise additional, or modified, steps in accordance with what is described throughout this disclosure. An embodiment of method 600 may be implemented as software, such as computer program 513, to be executed by a processing unit comprised in an image capturing device, such as processor 511 described with reference to FIG. 5, whereby the image capturing device is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. An image capturing device comprising:
an image sensor for capturing a first image of a scene;
a light source for illuminating the scene with a first flash of coded light during capturing of the first image by the image sensor;
a network interface for effecting wireless communications with one or more of a communications network and a further image capturing device,
the image sensor being operative to detect a second flash of coded light emitted by the further image capturing device, and
a processing unit being operative to:
encode information into the first flash during capturing of the first image by the image sensor, the information enabling retrieval of the first image from a first data storage,
capture the first image; and
store the first image in the first data storage;
decode information which is encoded into the second flash, the information enabling retrieval of a second image captured by the further image capturing device from a second data storage;
retrieve the second image from the second data storage using the decoded information from the second flash; and
create a 3D model from the first image and the second image, wherein the 3D model is only created if a time interval between capturing the first image and capturing the second image is below a threshold time interval.

2. The image capturing device according to claim 1, the image sensor being operative to detect a second flash of coded light emitted by the further image capturing device, the processing unit being further operative to:
decode information which is encoded into the second flash, the information enabling retrieval of a second image captured by the further image capturing device from a second data storage; and
associatively store the decoded information with the first image.

3. The image capturing device according to claim 1, wherein the first image is captured in response to detecting the second flash emitted by the further image capturing device.

4. The image capturing device according to claim 1, wherein the encoded information comprises a location of an image in a data storage.

5. The image capturing device according to claim 1, wherein the first data storage is comprised in the image capturing device.

6. The image capturing device according to claim 1, wherein the first data storage is an external data storage which is accessible over the communications network, and the first image is stored in the first data storage by transmitting the first image via the network interface to the first data storage.

7. The image capturing device according to claim 1, wherein the second data storage is comprised in the further image capturing device.

8. The image capturing device according to claim 1, wherein the second data storage is an external data storage which is accessible over the communications network.

9. The image capturing device according to claim 1, wherein the image capturing device is a mobile terminal, a smartphone, a User Equipment, a tablet, or a digital camera.

10. A method of an image capturing device, the method comprising:
illuminating a scene with a first flash of coded light during capturing of a first image;
capturing the first image of the scene; and
storing the first image in a first data storage,
wherein information is encoded into the first flash, the information enabling retrieval of the first image from the first data storage;
detecting a second flash of coded light emitted by a further image capturing device;
decoding information which is encoded into the second flash, the information enabling retrieval of a second image captured by the further image capturing device from a second data storage;
retrieving the second image from the second data storage using the decoded information from the second flash; and
creating a 3D model from the first image and the second image, wherein the 3D model is only created if a time interval between capturing the first image and capturing the second image is below a threshold time interval.

11. The method according to claim 10, further comprising:
detecting a second flash of coded light emitted by a further image capturing device;
decoding information which is encoded into the second flash, the information enabling retrieval of a second image captured by the further image capturing device from a second data storage; and
associatively storing the decoded information with the first image.

12. The method according to claim 10, wherein the first image is captured in response to detecting the second flash emitted by the further image capturing device.

13. The method according to claim 10, wherein the encoded information comprises a location of an image in a data storage.

14. The method according to claim 10, wherein the first data storage is comprised in the image capturing device.

15. The method according to claim 10, wherein the first data storage is an external data storage which is accessible by the image capturing device, and the first image is stored in the first data storage by transmitting the first image to the first data storage.

16. The method according to claim 10, wherein the second data storage is comprised in the further image capturing device.

17. The method according to claim 10, wherein the second data storage is an external data storage which is accessible by the image capturing device.

18. The method according to claim 10, wherein the image capturing device is a mobile terminal, a smartphone, a User Equipment, a tablet, or a digital camera.

19. A computer program comprising computer-executable instructions for causing a device to perform the method according to claim 10, when the computer-executable instructions are executed on a processing unit comprised in the device.

20. A computer program product comprising a non-transitory computer-readable storage medium, the computer-readable storage medium having the computer program according to claim 19 embodied therein.

\* \* \* \* \*